United States Patent [19]
Park

[11] Patent Number: 5,327,686
[45] Date of Patent: Jul. 12, 1994

[54] CHAMFERING WIDTH MAINTAINING AND GLASS PLATE SHAPE SENSING APPARATUS FOR USE IN A GLASS PLATE CHAMFERING MACHINE

[76] Inventor: Kyung Park, 305-1109 Jugong #670 Daichi-Dong, Kangnam-Ku, Seoul, Rep. of Korea

[21] Appl. No.: 827,617

[22] Filed: Jan. 29, 1992

[30] Foreign Application Priority Data

Apr. 24, 1991 [KR] Rep. of Korea ............... 6619/1991

[51] Int. Cl.⁵ .................... B24B 51/00; B24B 1/00
[52] U.S. Cl. ...................... 51/165 R; 51/283 E; 51/240 GB
[58] Field of Search ............... 51/131.1, 132, 283 E, 51/283 R, 240 GB, 165.77, 165 R

[56] References Cited

U.S. PATENT DOCUMENTS

| | | | |
|---|---|---|---|
| 2,207,433 | 7/1940 | Haswell | 51/131.1 |
| 4,989,373 | 9/1989 | Park | 51/131.1 |
| 5,074,079 | 12/1991 | Park | 51/165.77 |
| 5,074,276 | 12/1991 | Katayama | 51/283 R |
| 5,099,617 | 3/1992 | Bovone | 51/99 |
| 5,123,218 | 6/1992 | Karlsrud | 51/131.1 |

Primary Examiner—Bruce M. Kisliuk
Assistant Examiner—Bo Bounkong
Attorney, Agent, or Firm—Lockwood Alex FitzGibbon & Cummings

[57] ABSTRACT

A chamfering width maintaining and glass plate shape sensing apparatus for use in a glass plate chamfering machine is disclosed. Two chamfering width maintaining and glass plate shape sensing rollers are provided so that they serve as function sharing rollers for sharing the function of changing the chamfering direction in accordance with the shape of the glass plate, when chamfering a glass plate in a chamfering machine. The provision of such function sharing rollers improves the contact state of the glass plate. Further, there is also provided a horizontally maintaining roller for supporting the glass plate during a chamfering, and such a provision makes it easier to chamfer or side-finish the glass plate.

3 Claims, 11 Drawing Sheets

CHAMFERING WIDTH MAINTAINING AND GLASS PLATE SHAPE SENSING APPARATUS FOR USE IN A GLASS PLATE CHAMFERING MACHINE

FIELD OF THE INVENTION

The present invention relates to a glass plate shape sensing and chamfering width maintaining apparatus for use in a chamfering machine, in which a roller for maintaining the chamfering width and a roller for sensing the glass plate shape in order to change the chamfering direction of a diamond wheel in accordance with the shape of the glass plate are let to share the chamfering width maintaining and glass plate shape sensing functions, and in which a horizontally maintaining roller is also installed in order to support the contacting state of the apparatus with the edges of the glass plate, so that the chamfering of a thin glass plate should be rendered easier, when a chamfering machine performs a chamfering on a glass plate in order to make the glass plate look more beautiful and safe.

BACKGROUND OF THE INVENTION

As is well known and as shown in FIG. 10, the conventional chamfering machine includes: a chamfering width maintaining roller 50 for maintaining the chamfering width constantly during a chamfering; a horizontally maintaining roller 51 for horizontally maintaining the glass plate so as for the glass plate not to drop during a chamfering; and two glass plate shape sensing rollers for changing the chamfering direction of a diamond wheel in accordance with the shape of the glass plate, these two rollers being disposed at the opposite sides of the chamfering width maintaining roller in a parallel form. (Korean Utility Model application 89-10143, 88-22093 and 90-11609).

If a chamfering is to be performed with the above described chamfering machine, first the thickness of the glass plate, the chamfering angle and the chamfering width have to be decided, and then, the glass plate to be chamfered has to be mounted on a rotary suction securing table. Then a chamfering wheel motor unit has to be adjusted to an inclined posture by turning a handle so as for the unit to be fit to the chamfering angle, and then, the angle and height of the horizontally maintaining roller have to be adjusted.

Then, as shown in FIG. 10, the heights of the chamfering width maintaining roller 50 and the horizontally maintaining roller 51 have to be adjusted so as for the roller 51 to support the lower face of the glass plate, and so as for a stopper 52 of the roller 50 to be engaged with the lower edge of the glass plate to be chamfered.

Here, care should be exercised so that the upper portion of the roller 50 should not touch the lower portion of the glass plate to be chamfered.

If the roller is adjusted to too high a position as the result of a careless adjustment, a state as shown in FIG. 11 occurs. Therefore, when a chamfering wheel 53 chamfers the glass plate 54, the upper portion of the roller 50 is also chamfered, thereby causing a fatal damage to the roller 50. On the other hand, if the roller 50 is adjusted too low, the stopper 52 of the roller 50 departs from the edge of the glass plate, with the result that either the glass plate is broken, of the chamfering width is formed to narrow, thereby committing a faulty chamfering.

Thus a great importance lies in the adjustment of the glass plate shape sensing roller and in maintaining the chamfering width. However, the adjustments are very difficult to perform in the case of a glass plate.

For example, as shown in FIG. 9B, if a chamfering face width L of 15 mm and a chamfering angle of 8° are to be attained in chamfering a glass plate 54 having a thickness of 5 mm, the height T of the edge remaining after the chamfering will be 2.9 mm. However, in the case of a glass plate having a thickness of 3 mm as shown in FIG. 9A, the height T of the edge of the glass remaining after the chamfering is 0.9 mm, and therefore, it is very difficult to perform the chamfering by putting the engaging stopper 52 of the chamfering width maintaining roller 50 by also putting the glass plate shape sensing roller.

Further, the greater the size of the glass plate and the thinner the thickness of the glass plate, the chamfering becomes more and more difficult. That is, if a glass plate is to be chamfered by mounting the glass plate a suction securing table, the chamfering width maintaining roller and the glass plate shape sensing roller are separately disposed below. Under this condition, the horizontally maintaining roller for horizontally maintaining the glass plate is also brought down by being separated from the glass plate, and therefore, the edges of the glass plate is lowered, with the result that the chamfering height is deviated from the set position.

Consequently, the lower edge of the glass plate is too much chamfered, while the upper edge of the glass plate is chamfered too little, thereby producing a defective chamfering.

Conventionally, a horizontally maintaining roller is used to support the side portion of the glass plate, so that the side finishing should be eased. However, if a chamfering is to be carried out after performing a side finish, or if a side finish is to be carried out after performing chamfering, the horizontally maintaining roller has to be detached and re-attached, with the result that the chamfering becomes very troublesome to carry out, as will as being time-consuming.

SUMMARY OF THE INVENTION

The present invention is intended to overcome the above described disadvantages of the conventional technique. Therefore it is the object of the present invention to provide a chamfering width maintaining and glass plate shape sensing apparatus for use in a chamfering machine, in which the chamfering and side finishing are rendered to be easier.

In achieving the above object, the apparatus of the present invention is constituted such that: a vertical support is fixedly installed at a side of the arcuate rotary support of a chamfering angle adjusting device installed at the end of a second joint beam of the chamfering machine; two sliding plates are installed in such a manner as to be actuated by pneumatic cylinders; and a roller support is fixedly installed to each of the two sliding plates.

Further, a horizontal maintaining roller is installed on another support in order to use it only when chamfering, and in order to present the lowering of the glass plate during a side finishing.

Two chamfering width maintaining and glass plate shape sensing rollers are installed on another support so as for it to simultaneously carry out the conventional functions of maintaining the chamfering width and sensing the glass plate shape. These chamfering width maintaining and glass plate shape sensing rollers are installed slightly higher than the bottom of slightly a diamond chamfering wheel in a parallel form with a small gap between them so as for a circular rotary support to be slightly rotated around the inside and outside circumference of the diamond chamfering wheel, with the result that the chamfering is carried out, with the rollers being contacted not to the edge corners, but to the edge face.

Further, the two chamfering width maintaining and glass plate shape sensing rollers are installed on the circular rotary support which is installed freely rotatably, and therefore, the chamfering width can be maintained constantly. Further, consequently, potentiometer which are connected through their axes each other depending on the shape of the glass plate can be turned to the left and right, and in accordance with this, electrical signals are sent to a servo-controller so as for a servo-motor to be turned to the left and right, so that the whole unit of the chamfering angle adjusting device can be turned to the left and right, and that the diamond wheel should be turned to the optimum chamfering position.

BRIEF DESCRIPTION OF THE DRAWINGS

The above object and other advantages of the present invention will become more apparent by describing in detail the preferred embodiment of the present invention with reference to the attached drawings in which:

FIG. 5 illustrates chamfering of a glass plate, in which

DESCRIPTION OF THE PREFERRED EMBODIMENT

Figure 1:
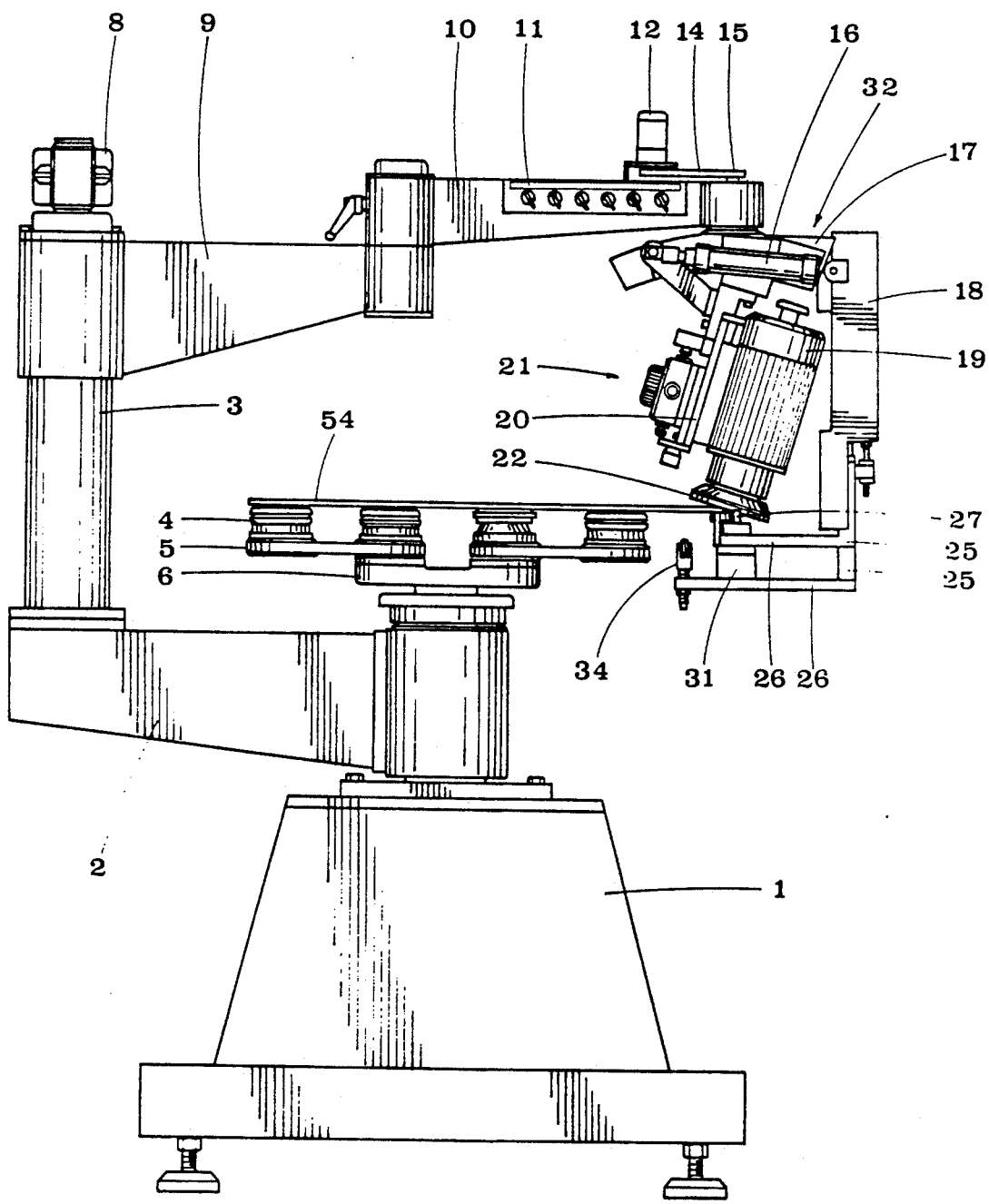
FIG. 1 is a side elevational view of the chamfering machine according to the present invention.

FIG. 1 is a side elevational view showing the constitution of the chamfering machine according to the present invention. As shown in this drawing, a rotary suction mounting table 6 for suction-securing a glass plate to be chambered is installed upon a body 1, and the rotary suction mounting table 6 is provided with a plurality of suction-securing members 4 and arms 5.

A horizontal beam 2 is extended from the shaft of the rotary mounting table 6 in a freely rotatable manner, and a vertical beam 3 upwardly extends from the end of the horizontal beam 2, while a forwardly and rearwardly advancing rotary cylinder 8, a first joint beam 9 and a second Joint beam 10 are connected in the cited order to the vertical beam 3. At the end of the second joint beam 10, there is suspended a chamfering angle adjusting device 32, and, upon the second joint beam 10, there is mounted a servomotor 12 which is capable of rotating the chamfering angle adjusting device 32 by transferring power through a timing belt 14 to a pulley 15.

From an arcuate rotary support 17 of the chamfering angle adjusting device 32, there are suspended a chamfering angle adjusting air cylinder 16 and a sliding plate 20 on which a chamfering wheel height adjusting device 21 and a chamfering wheel motor 19 with a chamfering wheel attached thereon are installed. All the above components are included in the prior art for which U.S. Pat. No. 4,989,373 was granted to the present applicant, and for which Korean Utility Model Application No. 88-13262 was filed by the present applicant.

The principal feature of the present invention is characterized by: a vertical supporting bar 18 installed on the arcuate rotary support 17; two roller supporting bars 26, 26a; and a horizontally maintaining roller 34 and a chamfering width maintaining and glass plate shape sensing roller 27 installed at the ends of the two roller supporting bars 26,26a. These components will be described below in detail.

Figure 2:
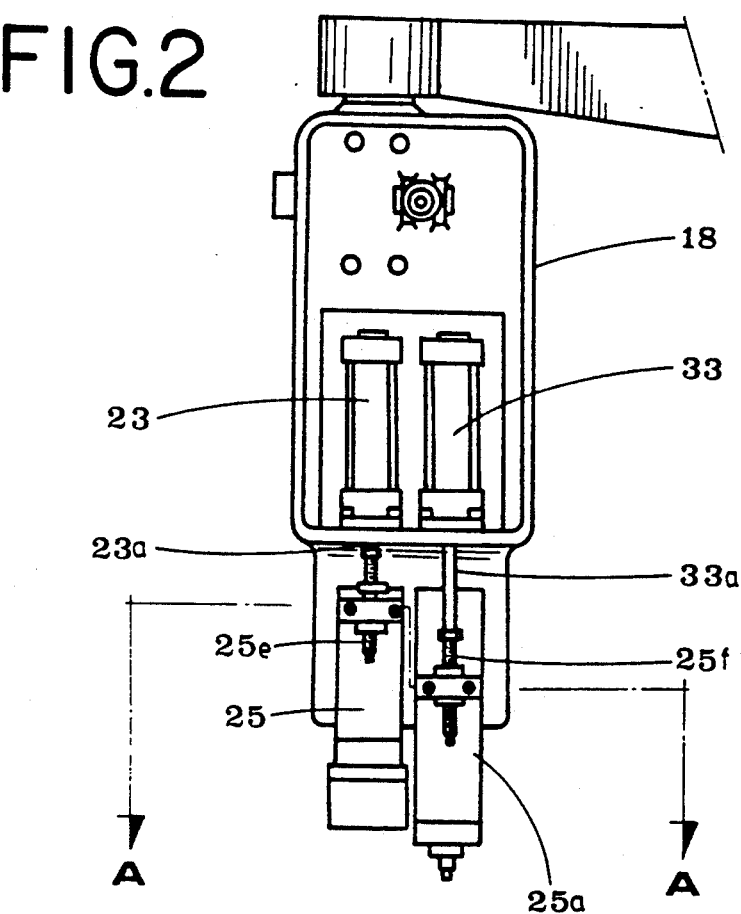
FIG. 2 is a rear view of the vertical support of FIG. 1.

As shown in FIGS. 1 and 2, within the upper portion of the vertical supporting bar 18 which is secured to one end of the arcuate rotary support 17, there are installed two air cylinders, one of them being a chamfering air cylinder 23, and the other being a side finishing air cylinder 33.

Figure 3:
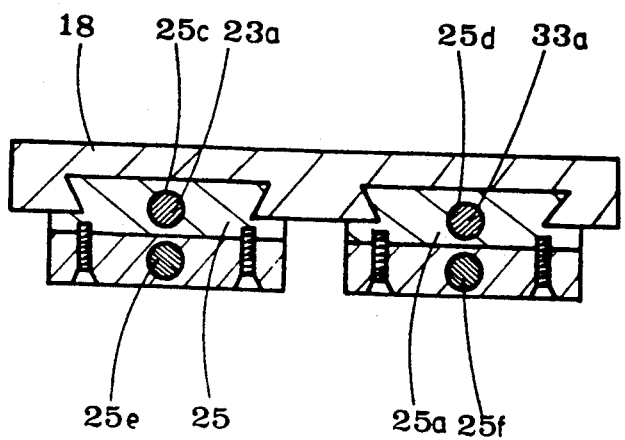
FIG. 3 is a sectional view taken along the line A—A of FIG. 2.

Further, directly below the two air cylinders 23, 33, there are installed two sliding plates 25, 25a, and these are installed as shown in FIG. 3 in such a manner as not to be separated but to be slided up and down. Further, as shown in FIG. 2, shafts 23a, 33a of the air cylinders 23, 33 are inserted into shaft holes 25c, 25d which are formed on the sliding plates 25, 25a, so that the shafts 23a, 33a should be able to move up and down by the action of the air cylinders. Here, reference codes 25e, 25f indicate height adjusting bolts.

Figure 4A:
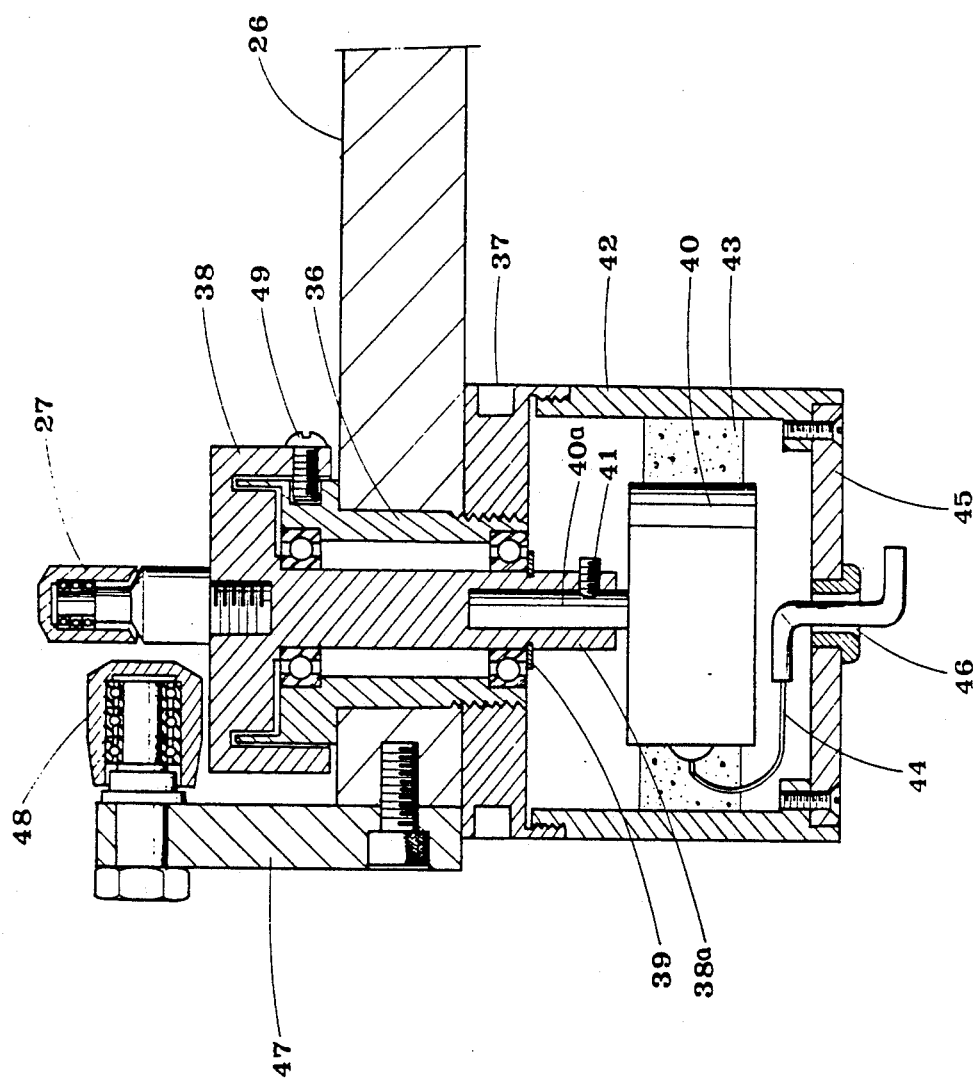
FIG. 4A illustrates the critical portions of the horizontally maintaining roller, the chamfering width maintaining roller and the glass plate shape sensing roller of the chamfering machine according to the present invention.
Figure 4B:
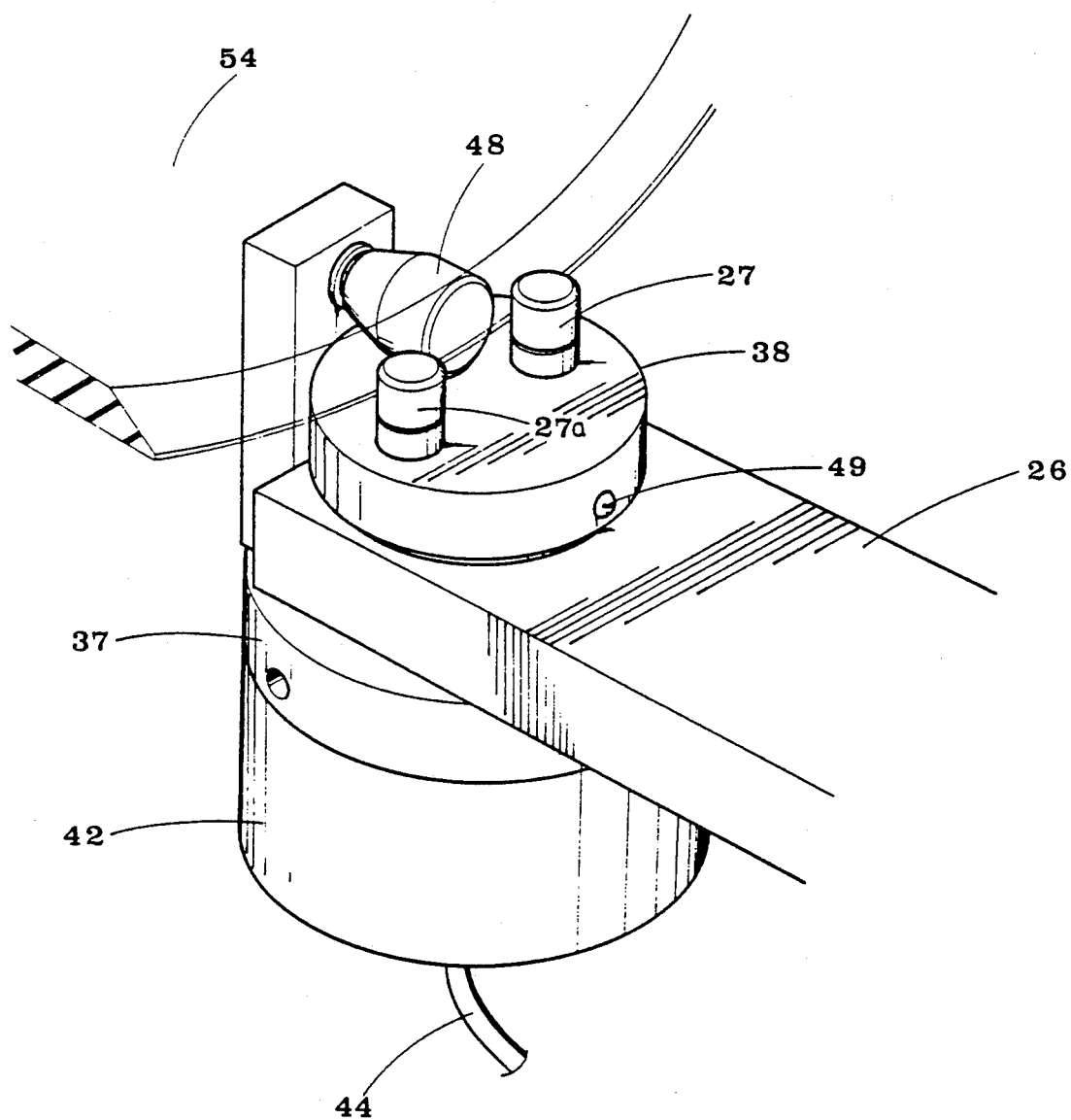
FIG. 4B is a perspective view of the components of FIG. 4A.

Directly below the two sliding plates 25, 25a, there are installed roller supporting bars 26, 26a, and a horizontally maintaining roller 34 is fixedly installed at the end of the roller supporting bar 26a in such a manner as to make it possible to adjust its height, while another horizontally maintaining roller 48 and a chamfering width maintaining and glass plate shape sensing roller (to be called a function sharing roller below) are installed at the end of the other roller supporting bar 26. This will be described in detail below referring to FIG. 4.

At an inner position from the end of the roller supporting bar 26, there is installed a bearing case 36 in such a manner as to pass through it, and the projected lower end portion of the bearing case 38 is installed within the hollow space of the bearing case by using bearings, and the projected lower end portion of the revolution shaft 38a is secured by fitting a ring washer 39. The two function sharing rollers 27, 27a are fixedly installed on the top of the circular support 38, in such a manner that they should have a certain distance between them.

To the lower end of the revolution shaft, a revolution shaft 40a of a potentiometer 40 is inserted, and secured by means of a bolt 41, and a water tight potentiometer cover 42 is treadably coupled with the cylindrical nut 37 in order to seal off the potentiometer 40 and the water tight potentiometer 40, while a securing sponge is inserted into between the potentiometer 40 and the water tight potentiometer cover 42, so that turning and vibrations should be prevented.

Meanwhile, a lead line 44 of the potentiometer 40 is connected through a through-hole 46 of a lid 45 to a servomotor controller 100, and a roller supporting bar 47 is installed at the end of the roller supporting bar 26 in a vertical form, while a horizontally maintaining roller 48 is installed to the top portion of the supporting bar 47.

The horizontally maintaining roller 48 is installed at a level lower than that of the glass plate shape sensing roller 27. In the drawings, reference code 11 indicates a switch box, and 49 indicates a circular rotary support rotation controlling bolt.

Figure 5A:
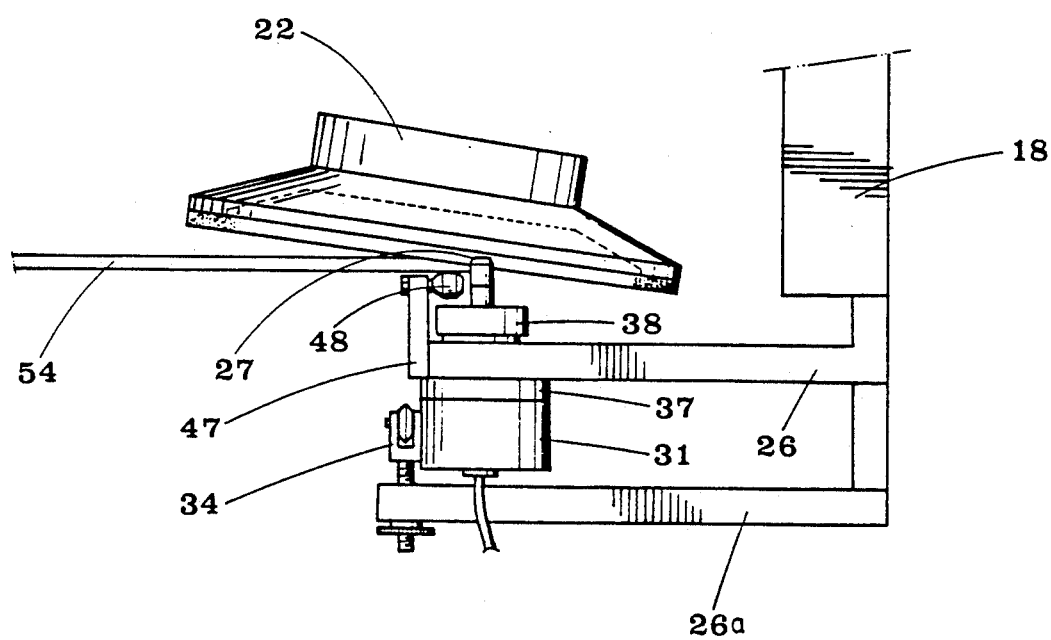
FIG. 5A illustrates the chamfering of a glass plate.
Figure 5B:
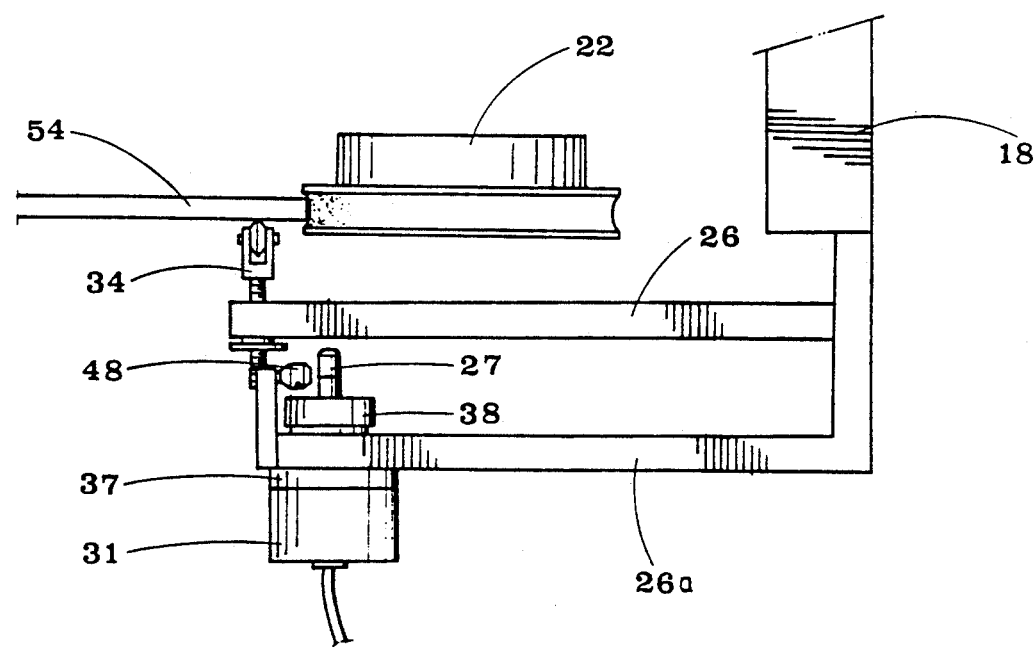
FIG. 5B illustrates a side finish of a glass plate.

In the apparatus of the present invention constituted as described above, the switch box 11 can be manually operated in such a manner that the two roller supporting bars 26, 26a can be selectively used as shown in FIG. 5. FIG. 5A illustrates the chamfering, and FIG. 5B illustrates the side finishing.

When a chamfering is carried out, the roller supporting bar 26a on which the horizontally maintaining roller 34 is installed is in a state lowered by the action of the side finishing air cylinder 33, while only the horizontally maintaining roller 48 and the function sharing rollers 27, 27a are raised by the action of the chamfering air cylinder 23 so as for them to be contacted with the glass plate, as shown in FIG. 5A.

Under this condition, the function sharing rollers 27, 27a are contacted with the glass plate in such a manner that the tops of the rollers 27, 27a should be disposed higher than the bottom of the chamfering wheel.

Figure 6:
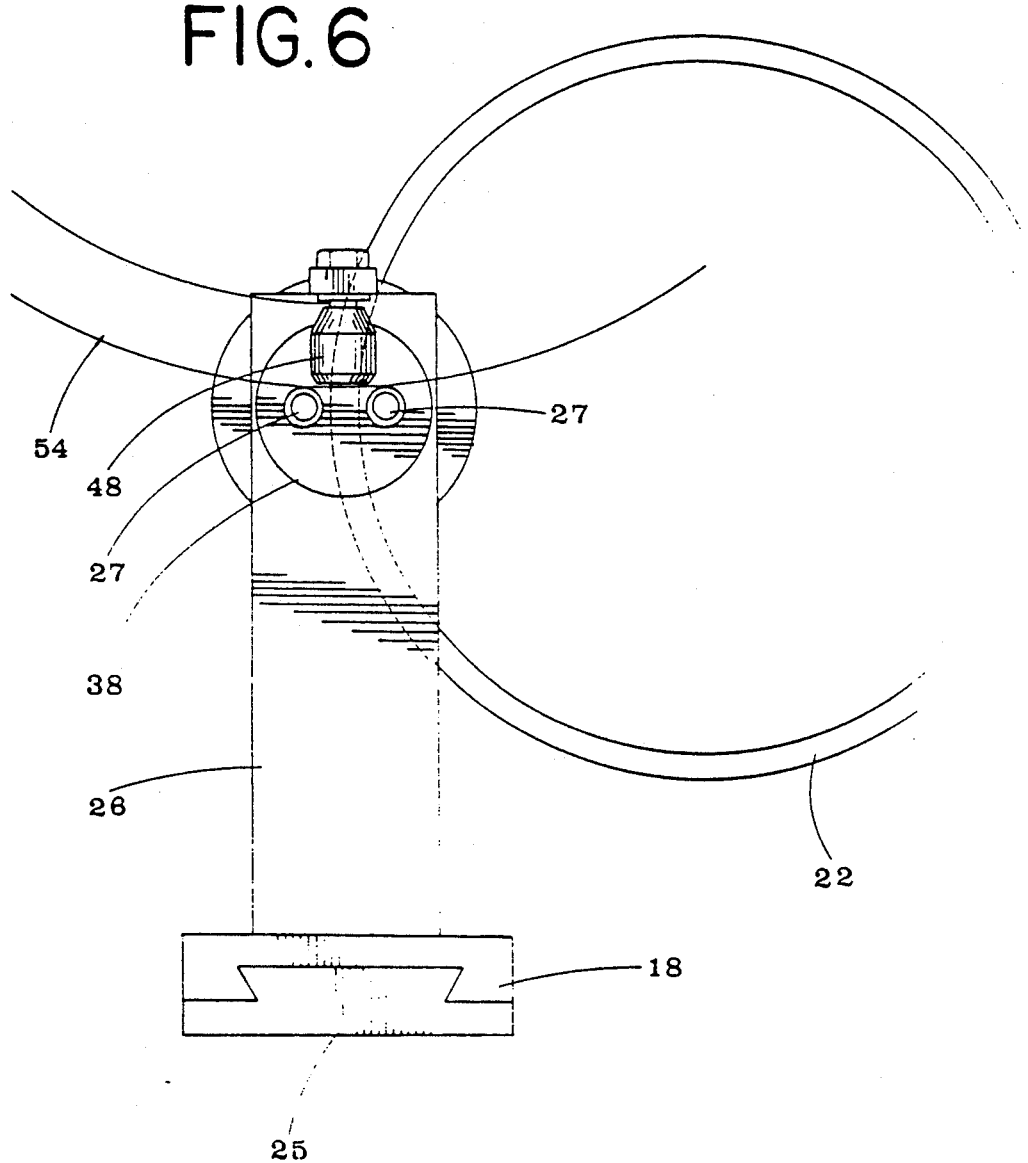
FIG. 6 illustrates the state of contact of the chamfering width maintaining and glass plate shape sensing rollers with the glass plate, illustrated in a plan view.
Figure 7:
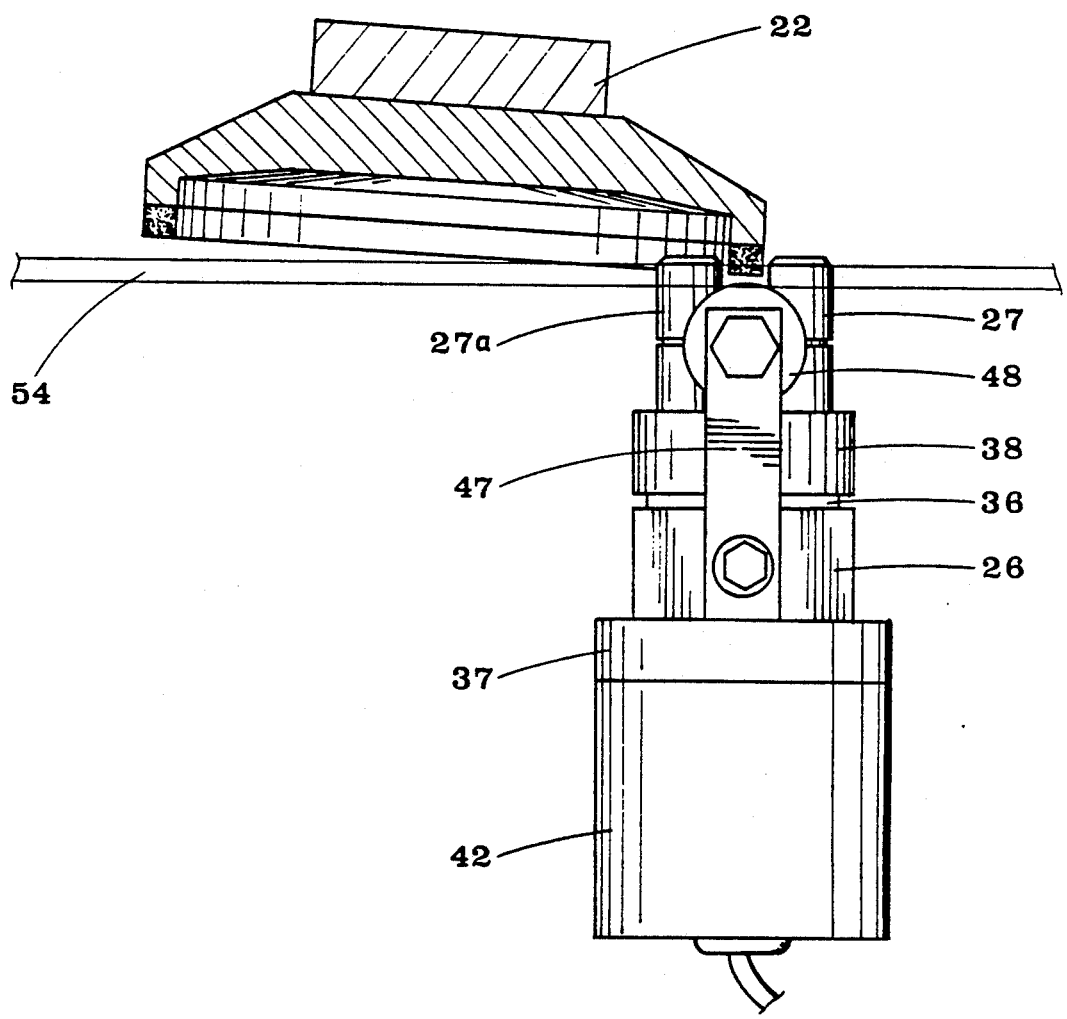
FIG. 7 illustrates the state of the contact of the chamfering width maintaining and glass plate shape sensing rollers with the chamfering wheel.

As shown in FIGS. 6 and 7, the chamfering is carried out with the diamond chamfering wheel 22 disposed between the function sharing rollers 27, 27a, and therefore, there will be no problem even if the function sharing rollers 27, 27a are projected slightly above the glass plate.

Therefore, regardless of the thickness of the glass plate 54, and the chamfering width and the chamfering angle, and without departing of the rollers from the glass plate and without wearing of the rollers, the rollers are capable of maintaining the chamfering width, and sensing the shape of the glass plate, in contact with the cut edges of the glass plate. Further, the function sharing rollers 27, 27a are installed at the opposite sides of the center of the circular support which is firmly and fixedly installed within the bearing case 36 by means of bearings which is in turn installed on the roller supporting bar 26.

Therefore, when the two function sharing rollers are contacted with the glass plate, the circular rotary support 38 is turned to the left and right in accordance with the variations of the shape of the glass plate.

Figure 8A:
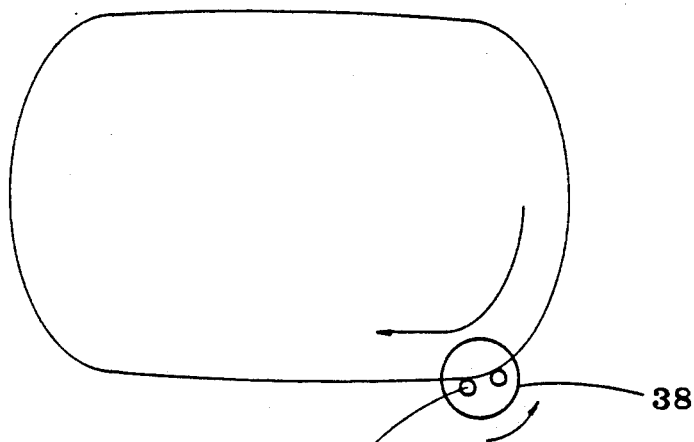
FIGS. 8A, 8B and 8C illustrates the operations of the chamfering width maintaining and glass plate shape sensing rollers.
Figure 8B:
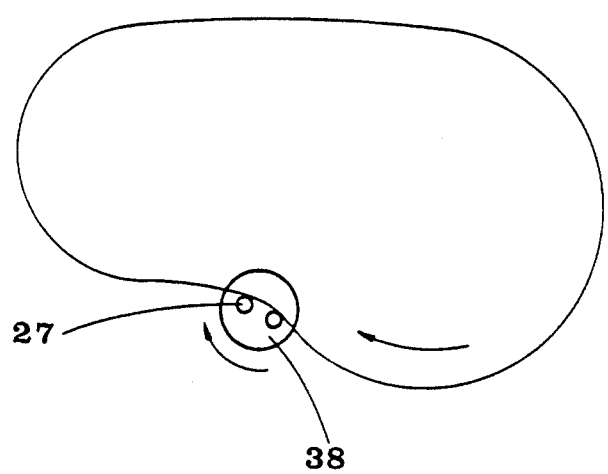
Figure 8C:
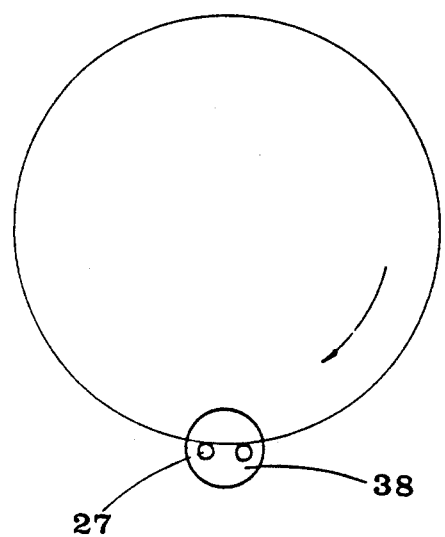
Figure 9A:
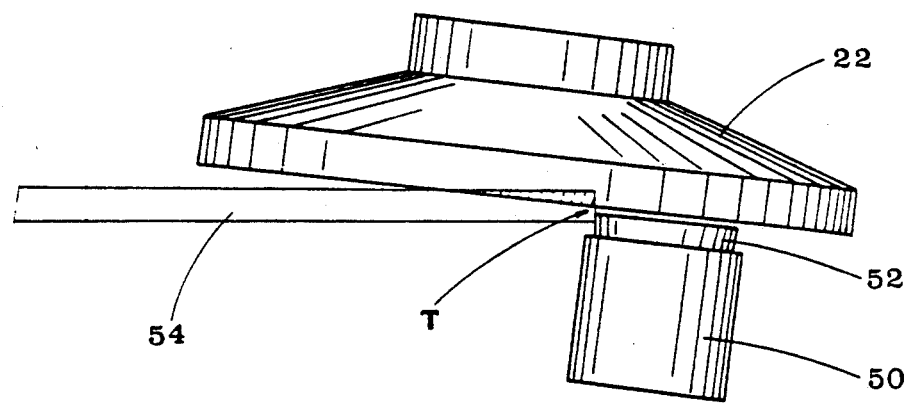
FIGS. 9A, 9B and 9C illustrate in a comparative view the contact of the chamfering width maintaining and glass plate shape sensing roller with the glass plate, and the contact of the conventional chamfering width maintaining and glass plate shape sensing roller with the glass plate.
Figure 9B:
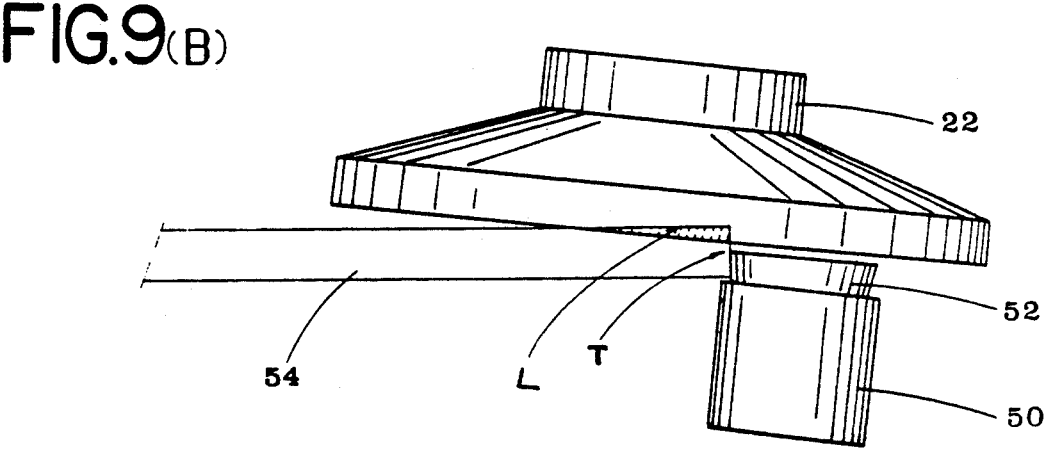
Figure 9C:
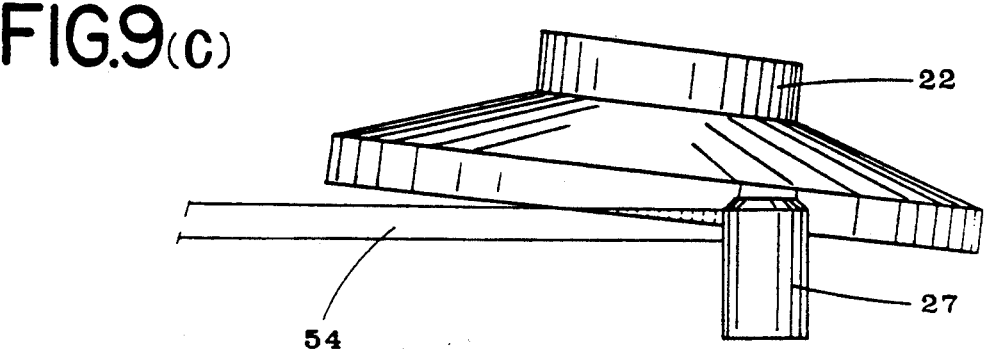
Figure 10:
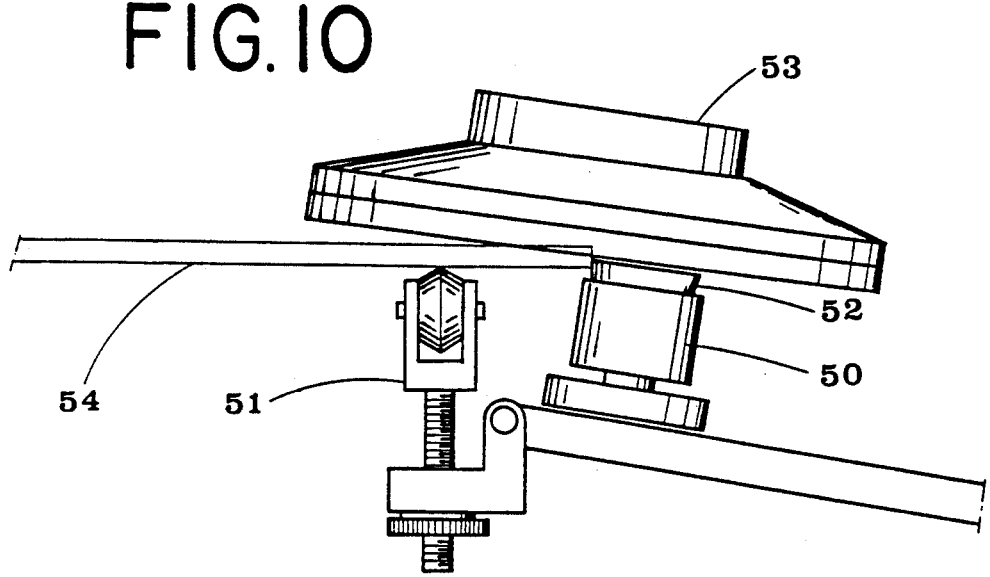
FIG. 10 illustrates the contacts of the drop preventing roller and the chamfering width maintaining roller with the glass plate in the conventional chamfering machine illustrated in a side view.
Figure 11:
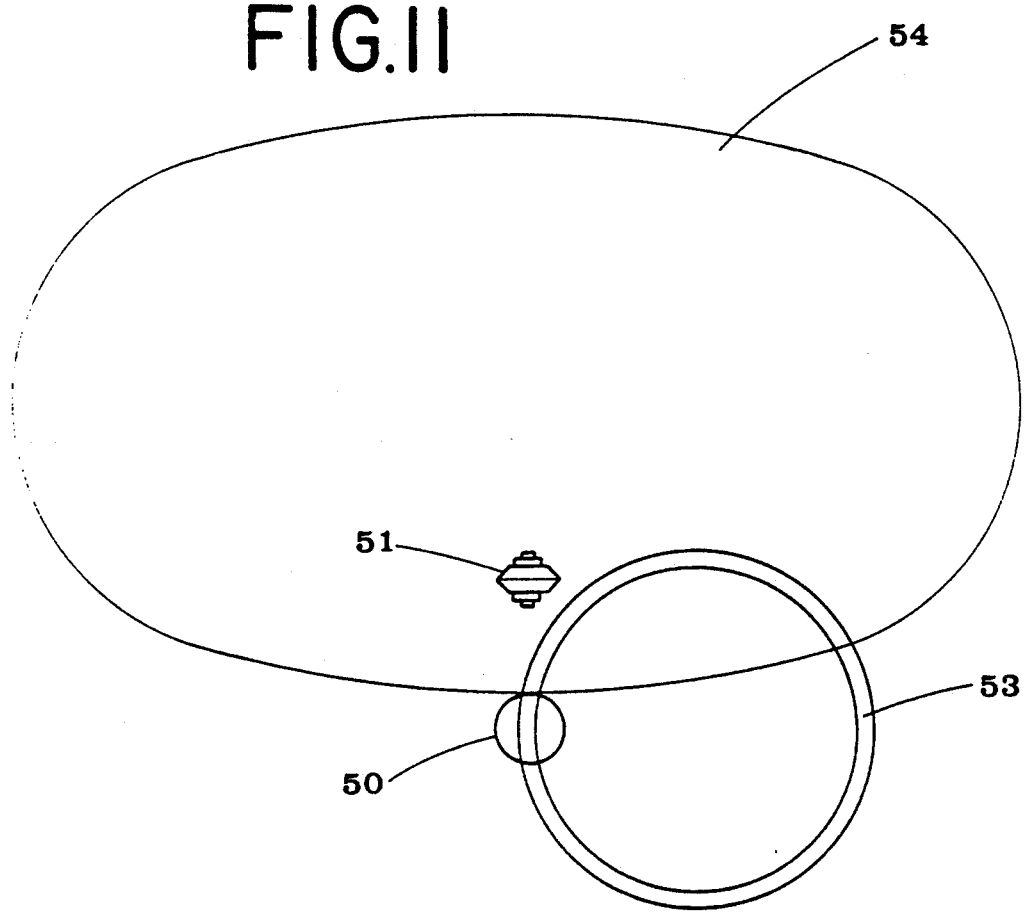
FIG. 11 is a plan view showing the contact of the chamfering width maintaining roller with the glass plate in a conventional chamfering machine.
Figure 12:
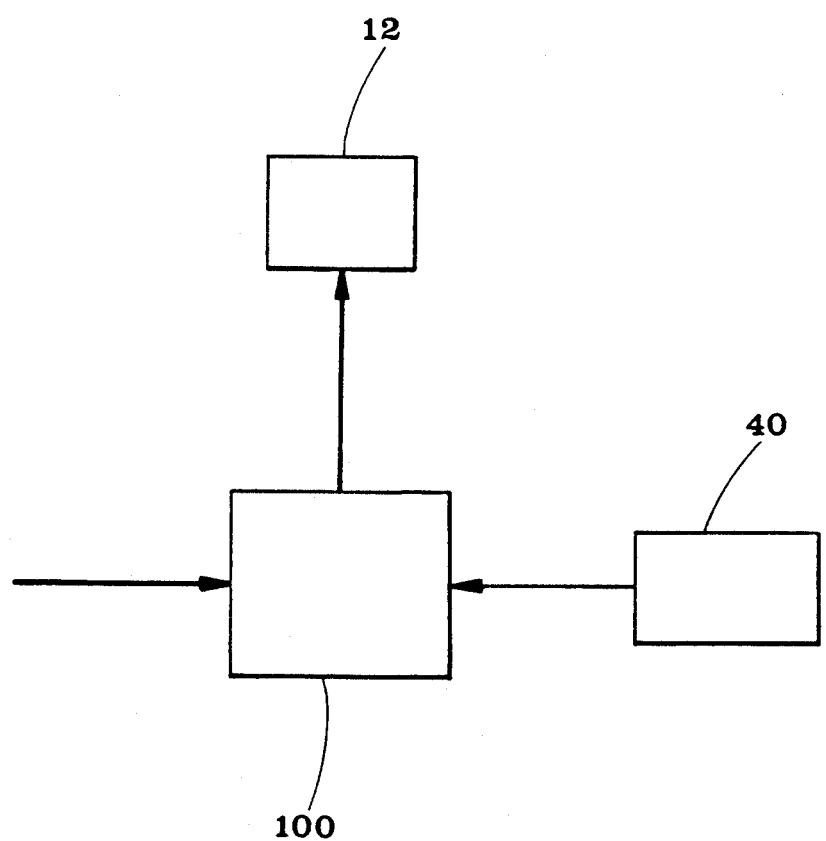
FIG. 12 illustrates the circuital constitutions between the servo-motor, the servo-motor controller and the potentiometer.

That is, referring to FIG. 8A, when the glass plate is rotated clockwise, the circular support 38 revolves anticlockwise around the revolution shaft 38a. In FIG. 8B, when the glass plate revolves clockwise, the circular support revolves clockwise around the revolution shaft 38a, while, in the case of a truly circular glass plate as shown in FIG. 8C, the circular support 38 does not revolve at all.

Thus as described above, when the circular rotary support 38 revolves, the revolution shaft 40a of the potentiometer 40 which is coupled with the revolution shaft 38a also revolves. Therefore, in accordance with the resistance value generated under this condition, electrical signals are supplied to the servomotor controller, and the turning of the servomotor causes the turning of the chamfering angle adjusting device 32 to be turned to the left and right, thereby adjusting the chamfering direction.

Thus, the function sharing rollers 27, 27a of the present invention are capable of simultaneously carrying out the functions of the chamfering width (bevel width) maintaining roller and the glass plate shape sensing roller of the conventional apparatus, which are separately installed.

Meanwhile, as shown in FIG. 5B, in the case where the side finishing is carried out, the roller supporting bar 26 on which the side finishing horizontally maintaining roller 34 is elevated, by the actions of the chamfering air cylinder 33, so that the roller 34 should be able to support the glass plate. Therefore, even a thin glass plate can be prevented from being lowered, and therefore, the present invention can overcome the conventional problem that the lower edge of the glass plate is too much chamfered, and the upper edge is chamfered too little. Further, the present invention eliminates the troublesome task of replacing the horizontally maintaining roller when the operation is shifted from a chamfering to a side finishing, or from a side finishing to a chamfering.

According to the present invention as described above, the following advantages and effects are obtained.

First, the diamond chamfering wheel can perform the chamfering through between the two function sharing rollers, and therefore, even when the thickness of glass plate, the chamfering width and chamfering angle are changed (as are done frequently), the horizontally maintaining roller and the chamfering width maintaining roller do not have to be re-adjusted, thereby providing a particular convenience.

Second, the two function sharing rollers are installed in a vertical posture at a level higher than the diamond chamfering wheel, and therefore, the rollers contact not with the edge corner but with the edge face, thereby permitting to perform a stable chamfering operation.

Third, the side finishing roller and the chamfering roller can be actuated by means of two air cylinders in the opposite directions, and therefore, the chamfering and finishing operations can be carried out swiftly in spite of frequent shiftings from a chamfering to a finishing.

Fourth, the chamfering direction can be automatically turned in accordance with the shape of the glass plate.

What is claimed is:

1. A chamfering width maintaining and glass plate shape sensing apparatus for use in a glass plate chamfering machine, including: a horizontal beam 2 extended from a vertical shaft of a body; a vertical beam 3 having a top extending upwardly from an end of said horizontal beam 2; a first joint beam 9 extending horizontally from the top of said vertical beam 3; a second joint beam 10 having a top connected to the end of said first joint beam 9; and a chamfering angle adjusting device 32 suspending from the end of said second joint beam 10, said apparatus comprising: two sliding plates 25, 25a, installed within a vertical supporting bar 18 suspended from one end of an arcuate rotary support of said chamfering angle adjusting device 32; two air cylinders 23, 33 for making said sliding plates 25, 25a slide up and down; two roller supporting bars 26, 26a individually connected to the ends of said sliding plates 25, 25a respectively; a horizontally maintaining roller 34 installed on said roller supporting bar 26a in a freely rotatable manner; another horizontally maintaining roller 48 and two function sharing rollers 27, 27a installed on said roller supporting bar 26; a servomotor 12 for controlling said chamfering angle adjusting device 32 and installed on the top of said second joint beam 10; and a servomotor controller electrically connected to said servomotor 12 and to a potentiometer 40.

2. A chamfering width maintaining and glass plate shape sensing apparatus for use in a glass plate chamfering machine as claimed in claim 1, wherein said function sharing rollers 27, 27a are installed with a certain gap on opposite sides of the center of a circular rotary support 38, with said support 38 being freely rotatably installed on said roller supporting bar 26; and said horizontal maintaining roller 48 is fixedly installed between said function sharing rollers 27, 27a in a horizontal form.

3. A chamfering width maintaining and glass plate shape sensing apparatus for use in a glass plate chamfering machine as claimed in claim 2, wherein said function sharing rollers 27, 27a are disposed in a vertical form and with a certain gap between them in such a manner that inside and outside diameters of a diamond chamfering wheel should come between said rollers 27, 27a; and that said diamond chamfering wheel should be able to run fast between said rollers 27, 27a and that said rollers 27, 27a should be able contact with an upper portion of a side face of the glass plate.

* * * * *